United States Patent [19]
Eltomi et al.

[11] Patent Number: 5,227,306
[45] Date of Patent: Jul. 13, 1993

[54] METHOD AND APPARATUS FOR CONTROLLING THE RATE OF CHLORINE DIOXIDE GENERATION

[75] Inventors: Sam F. Eltomi, Kansas City, Mo.; Keith O. Wise, Mobile, Ala.

[73] Assignee: Ashchem. I.P., Columbus, Ohio

[21] Appl. No.: 709,010

[22] Filed: May 13, 1991

[51] Int. Cl.$^5$ ............................................. G01N 35/08
[52] U.S. Cl. .................................... 436/55; 436/50; 422/62; 422/37
[58] Field of Search ............... 436/163, 904, 55, 50; 422/62, 37; 435/37

[56] References Cited

U.S. PATENT DOCUMENTS

| | | | |
|---|---|---|---|
| 3,852,033 | 12/1974 | Hultman | 436/55 |
| 4,013,761 | 3/1977 | Ward et al. | 422/113 |
| 4,143,115 | 3/1979 | Ward | 422/113 |
| 4,247,531 | 1/1981 | Hicks | 422/120 |
| 5,108,929 | 4/1992 | Segura et al. | 436/55 |

OTHER PUBLICATIONS

Automated Approach to ClO$_2$ Disinfection, Water Engineering Magazine pp. 35-38, Oct. 1988.

Primary Examiner—James C. Housel
Assistant Examiner—Lien Tran

[57] ABSTRACT

A method and apparatus for the automatic control of oxidative treatment of material with chlorine dioxide. The method and apparatus of the invention automatically adjust the amount of chlorine dioxide applied to the system being treated by a multiple feed-back loop system to provide adequate oxidative treatment while avoiding overfeed or underfeed conditions.

17 Claims, 1 Drawing Sheet

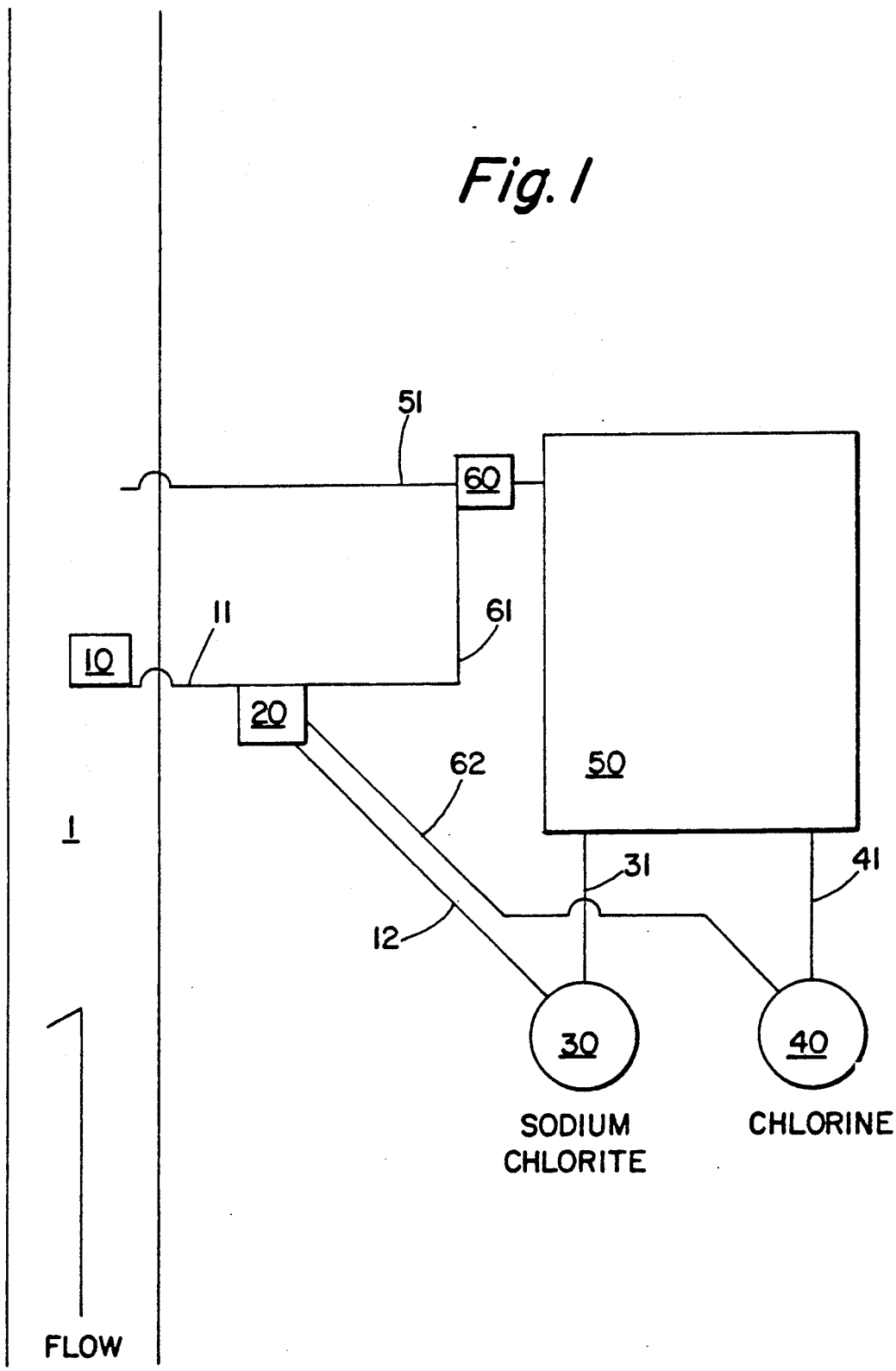

METHOD AND APPARATUS FOR CONTROLLING THE RATE OF CHLORINE DIOXIDE GENERATION

This invention relates to a method and apparatus for controlling the rate at which chlorine dioxide is generated, wherein the method and apparatus are responsive to the needs of the system for treatment with chlorine dioxide.

BACKGROUND OF THE INVENTION

Chlorine dioxide has long been recognized as an oxidizing treatment having great utility in a variety of applications. Chlorine dioxide is used in the paper industry as a bleaching agent for paper pulp, in the water and waste treatment industry as a biocide for bacteria, algae and various water-borne microorganisms, in the fat rendering and tallow industry as both a biocide and bleaching agent, and generally as an oxidant useful in destroying certain organic materials, such as phenols. In whatever application chlorine dioxide is used, the need for treatment is likely to fluctuate depending on variations in the amount of material being treated, the degree of pollution or contamination of the material, the degree of bleaching required, and so forth.

The process of treating water and other materials with chlorine dioxide consists generally of introducing and mixing a quantity of chlorine dioxide with the material, wherein the quantity of chlorine dioxide is sufficient to completely and effectively treat the material. In some applications chlorine dioxide is continuously generated in quantities large enough to meet the treatment requirements of peak demand. There are problems associated with operating a chlorine dioxide generator in this manner. During periods of low demand, operating in an overtreatment mode is uneconomical, inefficient, and may even result in excessive wear and tear on mechanical and electronic equipment and those materials exposed to the high concentrations of $ClO_2$ and reactants. During periods of extremely high demand, undertreatment conditions may result leaving materials incompletely sanitized or bleached.

To overcome the problems inherent in the fixed rate generation of chlorine dioxide, chlorine dioxide generator operators can manually adjust the generation rate in response to variations noted from periodic measurements of the need for treatment. The measurements may be based on, for example, the amount of material requiring treatment, the amount of pollutants needing treatment, and the oxidation-reduction potential of the water. However, unless the measurements of the need for treatment and the accompanying adjustments have a high frequency, or coincide fortuitously with rapid increases and decreases in the need for treatment, over and undertreatment conditions may occur.

Automated systems have been developed for supplying chlorine dioxide on an as-needed basis to treat water. One such system known to the inventors comprises a chlorine dioxide generator which operates on a constant rate basis, sending an aqueous stream of $ClO_2$ produced by the generator to a holding tank. The volume of $ClO_2$ solution in the tank released to the water treatment site is based on a signal received from a treatment need detecting device, such as a flow monitoring device in the water treatment sluice. In the event the holding tank becomes filled with chlorine dioxide solution the generator is shut down until more $ClO_2$ solution is needed.

Because chlorine dioxide is released from a water solution on standing, a $ClO_2$ solution held in the tank will loose strength and hence effectiveness, thus making complete treatment of materials with that solution uncertain. The chlorine dioxide which has left the solution may become trapped in the free space of the holding tank if not properly vented. Should the concentration of $ClO_2$ in the air above the tank reach a critical level a spontaneous explosion of the chlorine dioxide may occur.

An automated $ClO_2$ generating system was developed by Rio Linda (Fischer & Porter Co., Warminster, Pa.) and installed at a drinking water treatment facility in Shreveport, La. The Shreveport system is described in an article entitled "Automated Approach for $ClO_2$ Disinfection" found in the Oct. 1988 issue of *Water Engineering Magazine*, pp. 35–38. It appears that the generator equipment of the Rio Linda Shreeveport system is of the vacuum eductor type which uses the chlorite-chlorine route to produce $ClO_2$.

The control portion of the Rio Linda Shreveport system operates by receiving signals from a water flow monitoring device and simultaneously adjusting mechanical valves associated with the supply sources of both the sodium chlorite and chlorine gas reactants feeding the generator. It is well known that it is difficult to mechanically control gas flowing through a valve to the degree of accuracy needed to achieve the desired 2:1 ratio of reactants in order to operate the system at the most desired levels of efficiency and economy. Furthermore, the control system associated with the supply valves does not take into account the flow differences caused by the level of reactants in their respective tanks, the pressure at which the materials are delivered, or the relative concentrations of the reactants. The result is that the reactants are not used economically.

It will be well understood by practitioners of the art of oxidation treatment that the equipment and processes used in the treatment of water with $ClO_2$ may be used in the paper and pulp industry, the fat rendering industry and others. It is believed that little or no modification is necessary to adapt a method and apparatus for use in applications other than water treatment.

SUMMARY OF THE INVENTION

The method and apparatus of the present invention provide a system for controlling the generation of chlorine dioxide so that the amount of $ClO_2$ treatment delivered is responsive to the need for treatment with $ClO_2$.

The method and apparatus of the invention are based on the premise that the rate at which chlorine dioxide is generated may be automatically controlled by a multiple-loop feedback system. The invention operates by adjusting the amount of one or more reactants fed to the chlorine dioxide generator in response to the detected need for treatment; monitoring the product stream exiting the generator for the composition thereof and adjusting the amount of the remaining reactants fed to the generator until the composition of the product stream exiting the generator reaches a predetermined state, thus effecting adequate $ClO_2$ treatment responsive to the detected need for treatment.

The apparatus and method described in detail herein may be used with several methods for generating chlorine dioxide. For example, the apparatus and method may be used in conjunction with the chlorite-chlorine route, the mineral acid-chlorite route, and the chlorite-hypochlorite-mineral acid route for generating chlorine dioxide.

BRIEF DESCRIPTION OF THE DRAWING

FIG. 1 illustrates the apparatus for automatically controlling the generation of chlorine dioxide.

DETAILED DESCRIPTION OF THE INVENTION

The method of the invention relates to treating a fluidics system which comprises:

(a) measuring the need for chlorine dioxide treatment;

(b) adjusting the quantity of a first reactant or first group of reactants fed to a chlorine dioxide generator in an amount proportional to the measured need for treatment;

(c) monitoring the product stream exiting the generator to determine the composition thereof; and (d) adjusting the quantity of a second reactant or second group of reactants fed to the chlorine dioxide generator to bring the composition of the product stream exiting the generator to a predetermined state, thereby producing a quantity of chlorine dioxide sufficient to meet the measured need for treatment.

The apparatus of the invention for treating a fluidics system comprises:

(a) a means for measuring the need for chlorine dioxide treatment;

(b) a means for adjusting the quantity of a first reactant or first group of reactants fed to a chlorine dioxide generator in an amount proportional to said measured need for treatment;

(c) a means for monitoring the product stream of the generator to determine the composition thereof; and (d) a means for adjusting the quantity of a second reactant or second group of reactants fed to the generator to bring the composition of the product stream exiting the generator to a predetermined state, thereby producing a quantity of chlorine dioxide sufficient to meet the measured need for treatment.

One embodiment of the method and apparatus of the invention is intended for use with the chlorite-chlorine process of generating chlorine dioxide. In the typical chlorite-chlorine reaction sodium chlorite and chlorine react as follows:

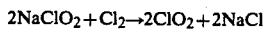

$$2NaClO_2 + Cl_2 \rightarrow 2ClO_2 + 2NaCl$$

It will be understood that other alkaline earth metal forms of the chlorite may be used in the reaction. The preferred alkaline earth metal chlorite is sodium, but other chlorites derived from one or more alkaline earth metals selected from the group consisting of Li, K, Na, Rb, Cs and Fr may be used.

In this, the most preferred embodiment, control of the amount of chlorite fed to the generator is responsive to the measured need for treatment with $ClO_2$. Consequently, control amount of chlorine fed to the generator is responsive to the composition of the product stream exiting the generator. A schematic view of this embodiment is depicted in FIG. 1.

In FIG. 1, a sluice 1 is shown in which the material to be treated (for example, water, paper pulp, rendered fat, sewage, etc.) is carried. The overall direction of the fluidics flow of materials in the sluice is shown by the arrow. A treatment need sensing device 10 is shown in contact with the contents of the sluice. The sensing device detects the need for treatment of materials flowing in the sluice by monitoring such parameters as flow rate or volume, residual pollution (such as with a phenol or hydrogen sulfide detector), residual chlorine dioxide (if previously treated with $ClO_2$), oxidation-reduction potential, or the number of bacteria present in the material, for example.

A signal from the treatment need sensing device which indicates the need for treatment is sent to the controller 20 via signal transmitting means 11. The signal may be conveyed via the connection by electronic, optical, mechanical or other suitable means. Controller 20 reads the information sent by the treatment need sensing device and signals the sodium chlorite supply 30 to proportionally adjust the amount of sodium chlorite delivered via conduit 31 to the chlorine dioxide generator 50 for adequate treatment of the material flowing in the sluice. It will be understood that a signal from the treatment need detector indicating an increased need for treatment will cause the controller to increase the amount of sodium chlorite delivered to the generator in an amount proportional to the increased need for treatment. Conversely, it will be understood that a signal indicating decreased need for treatment will cause the controller to decrease the amount of sodium chlorite delivered to the generator in an amount proportional to the decreased need for treatment.

It will also be understood by practitioners skilled in the art that when the amount of one of the reactants for $ClO_2$ fed to the generator is altered the relative composition of the product stream of the generator will also change. This change in the product stream can be detected and measured by such parameters as pH and oxidation-reduction potential. For example, when an increased amount of chlorite is delivered to the generator the pH of the effluent stream will rise. Chlorites are basic and the rise would be attributable to either an excess of the high pH chlorite present in the product stream, or to a greater amount of low pH chlorine being reacted. Likewise, an increase in the amount of chlorine delivered to the generator would make the pH of the product stream drop, either due to an increased amount of unreacted chlorine present in the product stream, or to a greater amount of high pH chlorite being reacted.

In the figure, a means for monitoring the relative composition of the product stream 60, for example a glass pH electrode, is shown in conduit 51. Changes in the composition of the product stream are detected by the means for monitoring and the controller 20 is signaled of these changes. The controller responds to changes in the product stream composition by signalling the chlorine supply 40 to deliver more or less chlorine to the generator, as required.

The preferred controller is a microprocessor based controller having multiple channel capability. An off the shelf controller, such as the Model 95G controller with four-channel capacity commercially available from Great Lakes Instruments, Milwaukee, Wis. is very suitable for this application. The controller should accommodate at least two input control signals, process the same, and have the ability to produce two output control signals.

Generation equipment suitable for use in association with this embodiment of the method and apparatus of the invention are described in U.S. Pat. Nos. 4,013,761 and 4,147,115. It is believed other generation equipment for the chlorite-chlorine reaction route may be used with the method and apparatus of the present invention with little or no modification of the generation equipment required.

Not shown in the figure are the various means which may be used to control the delivery of sodium chlorite to the generator. Such means include, but are not limited to, variable rate pumps, valves and metering devices. Also not shown in the figure, it will be apparent to practitioners of the art that various means can be employed to control the delivery of chlorine to the generator. Such means include, but are not limited to, variable rate pumps, valves and metering devices.

It will be apparent to the practitioner that the apparatus described in FIG. 1 may alternatively be set up to adjust the chlorine supply fed to the reactor in response to the signal for the need for treatment and make the chlorite supply responsive to the change in pH of the effluent stream. It will be noted that due to current technical limitations in the metering of chlorine gas this form of the first embodiment, while operable, does not give as good results as when the control of the chlorite is responsive to the need for treatment.

A second embodiment of the method and apparatus of the invention is intended for use with the acid-chlorite route for generating chlorine dioxide. In the typical acid-chlorite reaction route to $ClO_2$, sodium chlorite and hydrochloric acid react as follows:

$$2HCl + 5NaClO_2 \rightarrow 4ClO_2 + 5NaCl + 2H_2O$$

It will be understood that other alkaline earth metal forms of the chlorite may be used in the reaction. The preferred alkaline earth metal chlorite is sodium, but other chlorites derived from one or more alkaline earth metals selected from the group consisting of Li, K, Na, Rb, Cs and Fr may be used.

The method and apparatus of this embodiment are identical to the first embodiment except for the reactants and that there is no preference for making the feed of a particular reactant responsive to need for treatment. In this embodiment the feed of either the chlorite or the acid reactant may be responsive to the detected need for treatment with the feed of the remaining reactant being responsive to the relative composition of the product stream of the generator.

The third embodiment of the method and apparatus of the invention is adapted for use with the chlorite-hypochlorite-mineral acid reaction route for producing chlorine dioxide. The following reaction is illustrative of the typical reaction using the chlorite-hypochlorite-mineral acid route:

$$2NaClO_2 + 1NaOCl + 2HCl \rightarrow 2ClO_2 + 3NaCl + H_2O$$

It will be understood that the sodium form of the chlorite and hypochlorite are preferred reactants, but that other alkaline earth metal forms of chlorite may be used. For example, the chlorite and hypochlorite may be derived from one or more alkaline earth metals selected from the group consisting of Li, K, Na, Rb, Cs and Fr. It will also be understood that HCl is the preferred mineral acid for use in the reaction, but that other mineral acids may be used. For example, the mineral acid may be one or more mineral acids selected from the group consisting of HCl, $H_2SO_4$, $H_3PO_4$, and $HNO_3$.

In this embodiment the feed of either a single reactant or a pair of reactants selected from the group consisting of chlorite, hypochlorite and mineral acid is controlled responsive to the need for treatment and the feed of the remaining reactant or reactants is controlled responsive to the relative composition of the product stream exiting the generator. The reactants may be controlled in any combination as this does not appear to be a critical factor to the operation of the method or the apparatus of the invention. Therefore, the following combinations of control are possible:

| BASIS OF CONTROL | |
|---|---|
| NEED FOR TREATMENT | PRODUCT STREAM |
| chlorite | hypochlorite |
|  | mineral acid |
| chlorite | mineral acid |
| hypochlorite |  |
| chlorite | hypochlorite |
| mineral acid |  |
| hypochlorite | chlorite |
|  | mineral acid |
| hypochlorite | chlorite |
| mineral acid |  |
| mineral acid | hypochlorite |
|  | chlorite |

In practicing this embodiment of the invention it is necessary to calibrate or otherwise configure the controller and/or means for adjusting the amount of reactants fed to the generator to accommodate reactants controlled in pairs which may not be of the same concentration and/or which react with the paired reactant in other than a 1:1 stoichiometric ratio. For example, in the $ClO_2$ reaction it is known that $NaClO_2$ and $NaOCl$ react in a 2:1 ratio. If the feed control of $NaClO_2$ is paired with that of $NaOCl$ the controller and/or means for adjusting the amount of reactants fed to the generator must be configured to allow the stoichiometrically correct amounts of the reactants be fed to the generator. If the paired reactants, $NaClO_2$ and $NaOCl$, are in solutions of the same concentration, the stoichiometry of the reaction requires that twice the volume of $NaClO_2$ be fed to the generator compared to that of $NaOCl$. In the likely situation that the paired reactants are not of the same concentration, the controller and/or means for adjusting the amount of reactants fed to the generator would have to be configured to take both the concentration of reactants and the stoichiometry of the reaction into account.

What is claimed is:

1. A method of treating a fluidics system with chlorine dioxide produced by a chlorine dioxide generator via a reaction and an alkaline earth metal chlorite and chlorine, said generator having an inlet means for feed of said reactants thereto and outlet means for egress of a chlorine dioxide product stream therefrom, wherein the amount of chlorine dioxide used to treat the system is automatically controlled in response to the treatment required by the system, said method comprising the steps of:

(a) measuring the need for chlorine dioxide treatment in the system;

(b) adjusting a quantity of only one of said reactants fed to the chlorine dioxide generator in an amount proportional to the measured need for treatment;

(c) monitoring the product stream exiting the generator to determine the composition thereof; and (d) adjusting the quantity of the other one of said reactants fed to the chlorine dioxide generator to bring the composition of the product stream to a predetermined state, thereby producing a quantity of chlorine dioxide sufficient to meet the measured need for treatment, wherein said alkaline earth metal chlorite is selected from the group consisting of sodium chlorite, lithium chlorite, potassium chlorite, rubidium chlorite, cesium chlorite and francium chlorite.

2. A method as claimed in claim 1, wherein an amount of said alkaline earth metal chlorite fed to the chlorine dioxide generator is proportional to the measured need for treatment and an amount of chlorine fed to the chlorine dioxide generator is responsive to the monitored composition of the product stream of the generator.

3. A method as claimed in claim 1, wherein the composition of said product stream is determined by monitoring the pH of said product stream.

4. A method as claimed in claim 1, wherein the composition of said product stream is determined by monitoring the oxidation-reduction potential of said product stream.

5. A method of treating a fluidics system with chlorine dioxide produced by a chlorine dioxide generator via a reaction of an alkaline earth metal chlorite and hydrochloric acid, said generator having an inlet means for feed of said reactants thereto and outlet means for egress of a chlorine dioxide product stream therefrom, wherein the amount of chlorine dioxide used to treat the system is automatically controlled in response to the treatment required by the system, said method comprising the steps of:
 (a) measuring the need for chlorine dioxide treatment in the system;
 (b) adjusting a quantity of only one of said reactants fed to the chlorine dioxide generator in an amount proportional to the measured need for treatment;
 (c) monitoring the product stream exiting the generator to determine the composition thereof; and
 (d) adjusting the quantity of the other one of said reactants fed to the chlorine dioxide generator to bring the composition of the product stream to a predetermined state, thereby producing a quantity of chlorine dioxide sufficient to meet the measured need for treatment,
wherein said alkaline earth metal chlorite is selected from the group consisting of sodium chlorite, lithium chlorite, potassium chlorite, rubidium chlorite, cesium chlorite and francium chlorite.

6. A method as claimed in claim 5, wherein the composition of said product stream is determined by monitoring the pH of said product stream.

7. A method as claimed in claim 5, wherein the composition of said product stream is determined by monitoring the oxidation-reduction potential of said product stream.

8. A method of treating a fluidics system with chlorine dioxide produced by a chlorine dioxide generator via a reaction of an alkaline earth metal chlorite, alkaline earth metal hypochlorite and mineral acid, said generator having an inlet means for feed of said reactants thereto and outlet means for egress of a chlorine dioxide product stream therefrom, wherein the amount of chlorine dioxide used to treat the system is automatically controlled in response to the treatment required by the system, said method comprising the steps of:
 (a) measuring the need for chlorine dioxide treatment in the system;
 (b) adjusting a quantity of only one of said reactants fed to the chlorine dioxide generator in an amount proportional to the measured need for treatment;
 (c) monitoring the product stream exiting the generator to determine the composition thereof; and
 (d) adjusting the quantity of the other one of said reactants fed to the chlorine dioxide generator to bring the composition of the product stream to a predetermined state, thereby producing a quantity of chlorine dioxide sufficient to meet the measured need for treatment,
wherein said alkaline earth metal chlorite is selected form the group consisting of sodium chlorite, lithium chlorite, potassium chlorite, rubidium chlorite, cesium chlorite and francium chlorite.

9. A method as claimed in claim 8, wherein the composition of said product stream is determined by monitoring the pH of said product stream.

10. A method as claimed in claim 8, wherein the composition of said product stream is determined by monitoring the oxidation-reduction potential of said product stream.

11. An apparatus for treating a fluidics system with chlorine dioxide produced by a chlorine dioxide generator via a reaction between reactants selected from the group consisting of (a) alkaline earth metal chlorite and chlorine, and (b) alkaline earth metal chlorite and hydrochloric acid, said generator having an inlet means for feed of said reactants thereto, and outlet means for egress of a chlorine dioxide product stream therefrom, wherein the amount of chlorine dioxide used to treat the system is automatically controlled in response to the treatment required by the system, said apparatus comprising:
 (a) a means for measuring the need for chlorine dioxide treatment;
 (b) a means of adjusting a quantity of only one of said reactants for chlorine dioxide generator in an amount proportional to the measured need for treatment;
 (c) a means of monitoring the product stream exiting the generator to determine the composition thereof; and
 (d) a means responsive to the determined composition for adjusting the quantity of another one of said reactants for chlorine dioxide fed to the chlorine dioxide generator to bring the composition of the product stream to a predetermined state, thereby producing a quantity of chlorine dioxide sufficient to meet the measured need for treatment,
wherein said alkaline earth metal chlorite is selected from the group consisting of sodium chlorite, lithium chlorite, potassium chlorite, rubidium chlorite, cesium chlorite and francium chlorite.

12. An apparatus as claimed in claim 11, wherein the amount of said alkaline earth metal chlorite fed to the chlorine dioxide generator is proportional to the measured need for treatment and the amount of chlorine fed to the chlorine dioxide generator is responsive to the monitored composition of the product stream of the generator.

13. An apparatus as claimed in claim 12, wherein the means of monitoring the composition of said product stream is a pH monitor.

14. An apparatus as claimed in claim 11, wherein the means of monitoring the composition of said product stream is an oxidation-reduction potential monitor.

15. An apparatus for treating a fluidics system with chlorine dioxide produced by a chlorine dioxide generator via a reaction of alkaline earth metal chlorite, alkaline earth metal hypochlorite and mineral acid, said generator having an inlet means for feed of said reactants thereto and outlet means for egress of a chlorine dioxide product stream therefrom wherein the amount of chlorine dioxide used to treat the system is automatically controlled in response to the treatment required by the system, said apparatus comprising:

(a) a means for measuring the need for chlorine dioxide treatment;

(b) a means of adjusting a quantity of only one of said reactants for chlorine dioxide generator in an amount proportional to the measured need for treatment;

(c) a means of monitoring the product stream exiting the generator to determine the composition thereof; and (d) a means of adjusting the quantity of another one of said reactants for chlorine dioxide fed to the chlorine dioxide generator to bring the composition of the product stream to a predetermined state, thereby producing a quantity of chlorine dioxide sufficient to meet the measured need for treatment, wherein said alkaline earth metal chlorite is selected from the group consisting of sodium chlorite, lithium chlorite, potassium chlorite, rubidium chlorite, cesium chlorite and francium chlorite.

16. An apparatus as claimed in claim 15, wherein the composition of said product stream is determined by monitoring the pH of said product stream.

17. An apparatus as claimed in claim 15, wherein the means of monitoring the composition of said product stream is an oxidation-reduction potential monitor.

* * * * *